United States Patent
Claramunt et al.

(10) Patent No.: US 7,216,952 B2
(45) Date of Patent: May 15, 2007

(54) MULTICOLOR-PRINTER AND METHOD OF PRINTING IMAGES

(75) Inventors: David Claramunt, Sant Esteve Sesrovires (ES); Carles Flotats, Barcelona (ES); Jose M Rio Doval, Sant Cugat del Valles (ES); Rodrigo Ruiz, Terrassa (ES); Francesc Subirada, Castellbisbal (ES); Marc Jansa, Barcelona (ES); Xavier Soler, Barcelona (ES); Fernando Juan, Viladecavalls (ES)

(73) Assignee: Hewlett-Packard Development Company, L.P., Houston, TX (US)

( * ) Notice: Subject to any disclaimer, the term of this patent is extended or adjusted under 35 U.S.C. 154(b) by 370 days.

(21) Appl. No.: 10/882,381

(22) Filed: Jul. 2, 2004

(65) Prior Publication Data

US 2005/0185009 A1    Aug. 25, 2005

(30) Foreign Application Priority Data

Jul. 28, 2003   (EP) .................................. 03102320

(51) Int. Cl.
*B41J 29/393* (2006.01)
(52) U.S. Cl. .......................................... 347/19; 347/13
(58) Field of Classification Search .................. 347/19, 347/13, 229, 232, 237, 238, 246
See application file for complete search history.

(56) References Cited

U.S. PATENT DOCUMENTS

| | | | |
|---|---|---|---|
| 4,609,279 A | 9/1986 | Hausmann et al. | |
| 4,774,524 A | 9/1988 | Warbus et al. | |
| 4,804,979 A | 2/1989 | Kamas et al. | |
| 5,040,000 A * | 8/1991 | Yokoi | 347/30 |
| 5,225,853 A * | 7/1993 | Kobayashi et al. | 347/33 |
| 5,526,107 A | 6/1996 | Bronstein | |
| 5,828,387 A * | 10/1998 | Wataya et al. | 347/14 |
| 6,118,132 A | 9/2000 | Tullis | |
| 6,501,929 B1 | 12/2002 | Warbus et al. | |

FOREIGN PATENT DOCUMENTS

| | | |
|---|---|---|
| DE | 34 06 244 | 8/1985 |
| EP | 0 729 846 | 9/1996 |

* cited by examiner

*Primary Examiner*—Lamson Nguyen
(74) *Attorney, Agent, or Firm*—Foley & Lardner LLP

(57) ABSTRACT

A multicolor-printer has at least a first and a second print station, first and second optical sensors and a surface recordings comparator. The first and second print stations are arranged to print images on a surface of a moving recording medium. The first and second optical sensors view, at the first and second print stations, an area of the recording medium surface to obtain at least one first surface recording, in a manner related to the first print station's image printing, and second surface recordings, respectively. A storage is arranged to store the first surface recording. The surface recordings comparator is arranged to test, during the recording medium movement, for correspondence of second surface recordings with the stored first surface recording. The printer is arranged to repeatedly, within one image, register raster lines of the image of the second print station to corresponding raster lines of the image of the first print station in response to correspondences found between the first and second surface recordings.

20 Claims, 7 Drawing Sheets

MULTICOLOR-PRINTER AND METHOD OF PRINTING IMAGES

FIELD OF THE INVENTION

The present invention relates to a multicolor-printer and a method of printing images.

BACKGROUND OF THE INVENTION

Multicolor printers produce images which are composed of a plurality of different single-color images. The quality of the final multicolor image depends, i.a., on the registration accuracy of the single-color images. With the increasing resolution of modern printers the registration accuracy has become an issue of interest.

Different multicolor printer types are known. Ink-jet printers have at least one print head from which droplets of ink are directed towards a print medium. Within the print head the ink is contained in a plurality of channels. Pulses cause the droplets of ink to be expelled as required from orifices or nozzles at the end of the channels. These pulses are generated e.g. by thermal components in thermal ink-jet print heads or by piezo-electric elements in drop-on-demand print heads. Ink-jet printers of the carriage type have a print head for each color. The print heads are mounted on a reciprocating carriage. Full-width or page-width ink-jet printers have, for each color, an array of nozzles extending across the full width of the print medium which is moved past the nozzle arrays. Each nozzle array is part of a print station which forms one single-color image or a part of it. Each print station produces its own single-color image on the print medium as it moves past the print stations. Each single-color image is composed of a plurality of closely spaced image dots, wherein single-color dots are superimposed to form a dot of a required color. The superimposed single-color dots may be printed onto each other or in a side-by-side relation. The recording medium may be paper or any other suitable substrate to which the ink adheres.

In known color xerographic systems, instead of the nozzle arrays, a plurality of print bars are provided which produce an electrostatic charge image on a recording medium. The print bars are selectively energized to create successive charge images, one for each color. The print bars may, for example, be LED print bars which produce the charge image an a previously charged photoreceptive surface. Each LED print bar is associated with a development system, which develops a latent image of the last charge image or exposure without disturbing previously developed images. The fully developed color image is then transferred to an output sheet, e.g. paper or the like. It is also possible to form electrostatic charge images directly on the output sheet which is then exposed to a toner of the respective color to produce a visible image.

To register single-color images for forming a multicolor image, encoder arrangements are utilized which determine the advance of the recording medium during the print process. Optical encoder systems are known in which an optical sensor is responsive to encoder marks.

In page-width printers the recording medium is, for example, moved by a conveying belt which is driven by rollers or pulleys. The movement of the belt with the recording medium may be detected by a single rotary encoder which is mounted on one of the rollers or pulleys. The advance of the belt is controlled by advance information represented by the rotary encoder signals. It is also known to place the encoder marks on the belt.

U.S. Pat. No. 5,526,107 is directed to a system and method for duplex printing wherein two images are registered at corresponding locations on the two sides of a print medium. The positions of the printed images relative to each other are synchronized by mechanical means or by detecting the position of special marks or an area of the image itself. It is mentioned that color-to-color registration may be achieved using a similar synchronization technique.

U.S. Pat. No. 4,804,979 discloses an electrostatic color printer with several print stations. Encoding marks are printed on the recording medium (which is paper). Each print station has its own optical sensor responsive to the encoding marks to detect and correct for variations of the recording medium to obtain registration of the single-color images. The registration is checked every 50 raster lines and brought into exact registration, if necessary.

EP 0 729 846 B1 discloses a high-speed ink-jet printing press in which registration marks are printed on the print medium. The registration marks are used, at low speeds, for aligning the recording stations, and, at high speeds, for registering the single-color images.

SUMMARY OF THE INVENTION

A first aspect of the invention is directed to a multicolor-printer. It comprises at least a first and a second print station, first and second optical sensors and a surface recordings comparator. The first and second print stations are arranged to print images on a surface of a moving print medium. The first and second optical sensors view, at the first and second print stations, an area of the print medium surface to obtain at least one first surface recording, in a manner related to the first print station's image printing, and second surface recordings, respectively. A storage is arranged to store the first surface recording. The surface recordings comparator is arranged to test, during the print medium movement, for correspondence of second surface recordings with the stored first surface recording. The printer is arranged to repeatedly, within one image, re-register raster lines of the image of the second print station to corresponding raster lines of the image of the first print station in response to correspondences found between the first and second surface recordings.

According to another aspect, a multicolor-printer is provided which comprises at least a first and a second print station, first and second optical sensors, a surface recordings comparator and at least one movement signal generator. The first and second print stations are arranged to print images on a surface of a moving print medium. The first and second optical sensors view, at the first and second print stations, an area of the print medium surface to obtain at least one first surface recording, in a manner related to the first print station's image printing, and second surface recordings, respectively. A storage is arranged to store the first surface recording. The surface recordings comparator is arranged to test, during the print medium movement, for correspondence of second surface recordings with the stored first surface recording. The movement signal generator generates signals representing recording medium movement. The printer is arranged to repeatedly, within one image, re-register raster lines of the image of the second print station to corresponding raster lines of the image of the first print station in response to correspondences found between the first and second surface recordings. Between repeated re-registrations, the first and second print stations are arranged to form their images by image dots on raster lines defined on the basis of the movement signals. According to another aspect, a method is provided of printing images onto each other on a surface of a moving print medium using a printer having at least a first and a second print station and first and second optical sensors viewing, at the first and second print stations, an area of the print medium surface. The method comprises recording a first surface recording at the first print station and relating it to a raster line of the image printed by the first print station; recording second surface recordings at the second print station and during the print medium movement, and testing for correspondence of the second surface recordings with the first surface recording; registering, in response to a correspondence found between one of the second surface recordings a corresponding raster line of the image printed by the second print station to the raster line of the image printed by the first print station. The activities of taking a first surface recording, taking second surface recordings, testing for correspondence, and registering a corresponding raster line of the image are repeated so that, within one image, repeated re-registrations are performed.

According to another aspect, a method is provided of printing images onto each other on a surface of a moving print medium using a printer having at least a first and a second print station and first and second optical sensors viewing, at the first and second print stations, an area of the print medium surface. The method comprises recording a first surface recording at the first print station and relating it to a raster line of the image printed by the first print station; recording second surface recordings at the second print station and during the print medium movement, and testing for correspondence of the second surface recordings with the first surface recording; registering, in response to a correspondence found between one of the second surface recordings a corresponding raster line of the image printed by the second print station to the raster line of the image printed by the first print station. The activities of taking a first surface recording, taking second surface recordings, testing for correspondence, and registering a corresponding raster line of the image are repeated so that, within one image, repeated re-registrations are performed. Between repeated re-registrations, the images are formed by image dots on raster lines defined on the basis of the movement signals.

Other features are inherent in the disclosed products and methods or will become apparent to those skilled in the art from the following detailed description of embodiments and its accompanying drawings.

DESCRIPTION OF THE DRAWINGS

Embodiments of the invention will now be described, by way of example, and with reference to the accompanying drawings, in which.

DESCRIPTION OF THE PREFERRED EMBODIMENTS

Figure 1:
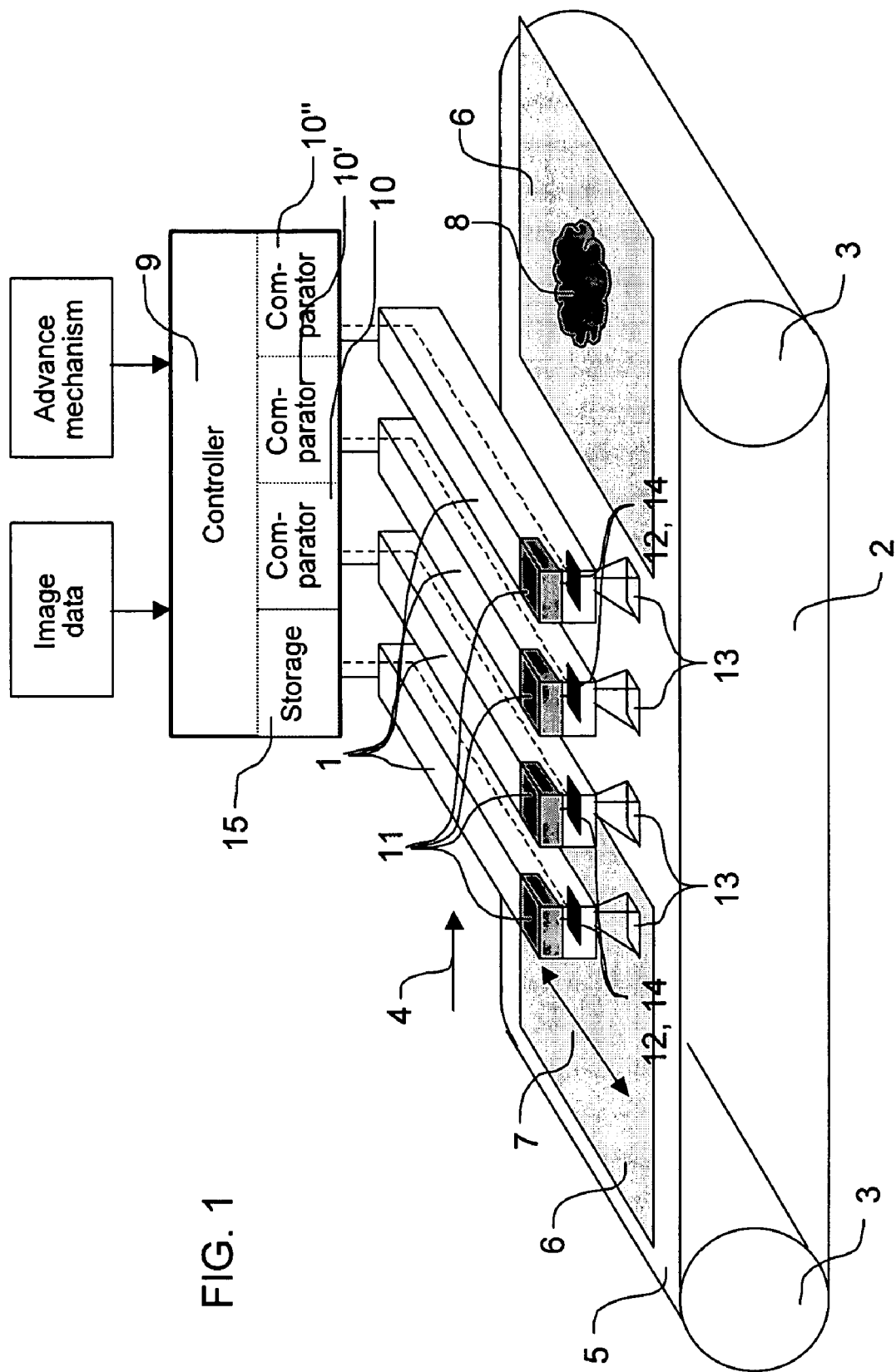
FIG. 1 is a schematic view of functional components of a multicolor-printer.

FIG. 1 is a schematic view of an embodiment of a multicolor printer. Prior to the detailed discussion of FIG. 1, some items of the embodiments will be discussed.

Printing of a multicolor (or full-color) image is based on what is called "color separation": The multicolor image is composed of a number of basic color images (e.g. using CMY or CMYB with C=cyan, M=magenta, Y=yellow, B=black) which are individually printed in an aligned manner. Although, in principle, the different colors could be provided by a single print station, in the preferred embodiments the single-color images are generated by different print stations. In some of the embodiments, the print stations are arranged spatially separated along the path of movement of the recording (or print) medium. They are in the form of linear arrays or elongated bars extending perpendicularly to the recording medium's direction of movement. In some embodiments, there is one print station for each basic color so that each print station produces a complete single-color image. To increase the variety of printable colors, the ink saturation and/or the resolution, some embodiments are provided with two or more print stations of the same color.

Different embodiments utilize different methods of transferring an image to the recording medium. In ink-jet printers and some xerographic printers the colors are directly transferred by liquid inks or toners to the recording medium (which may be, for example, paper, photo paper, a transparency, etc.), In other color xerographic systems the full-color image is first produced on a recording medium in the form of a photoreceptive surface, the image is then transferred to the print medium e.g. the paper.

In the embodiments the recording medium is moved past the print stations, e.g. by a recording medium conveyor. The conveyor is, for example, a belt conveyor or a cylindrical drum. The (main) direction of the recording medium movement is also called "advance direction". In some embodiments the movement is a continuous movement, in other embodiments the movement is stepwise. The print stations print their single-color images during the movement of the recording medium. The expression "during the movement" is meant herein in a general sense covering also the case of a stepwise movement in which the recording medium may actually be at rest when a print station prints e.g. one raster line (or group of raster lines), and is then moved to the next raster line (or group of raster lines).

Owing to the spatial distance between the print stations it takes some time until a certain point of the recording medium is moved from the first to print station to the second (and further downstream) print stations. Consequently, if the different print stations are to print onto this point in an aligned manner, their printing has to be performed in a time-shifted manner. The time-shift corresponds to the distance between the print heads divided by the (mean) velocity of the recording medium. The process of aligning the different single-color images—printed in the time-shifted manner—onto each other is also called "registering the images".

If the recording medium velocity is constant, the variable "time" is suitable for describing the interplay of the different print stations in a simple manner. Therefore, this description is used herein. Cases of varying velocity may also be correctly described, if one thinks of the variable "time" as the printer's "intrinsic time" which runs proportionally to the recording movement velocity.

The registration process is described in terms of "a first and a second print station". Typically, the printer has more than two print stations. The "first print station" may be thought of the most upstream print station, and the "second print station" may be thought of any one of the print stations downstream of it.

In the embodiments, an optical sensor is associated with each print station. Preferably, it is attached to the print station in a mechanically fixed relationship to the print head such that the relative position of sensor and print head is equal for all print stations. Each optical sensor views an area of the recording medium surface at its respective print station and, if required, records an image of it, called "surface recording". The surface recordings are used in the registration procedure since they enable a certain point of the recording medium, which is indicative of where the first print station printed a certain section (e.g. certain raster lines) of its image, to be recognized by the downstream print stations, as will be explained below.

In some of the embodiments, recognizing a certain point of the recording medium requires that something actually be printed at this point. However, in the more preferred embodiments, a certain point of the recording medium can also be recognized if nothing has been printed on it, since the optical sensors are sufficiently sensitive and have sufficient resolution to detect a pattern on the recording medium's surface, which is typically irregular. The detected pattern is therefore enough characteristic to enable unique surface identification and recognition of the point. For example, paper usually has such a pattern structure due to its fiber content. Therefore, in some embodiments the optical detectors view a region outside the fiducial print area, but in other embodiments they may view an area within it (since color on the surface pattern often does not destroy its recognizability).

In some of the embodiments the optical sensors are two-dimensionally extended sensor-cell arrays, for example CCDs (charge coupled devices). In embodiments in which the optical sensors are laterally accurately aligned and no lateral shifts of the recording medium appear, one-dimensional photosensor arrays can also be used. Suitable optical sensors are, for example, described in U.S. Pat. No. 6,118, 132 (there for measuring the velocity, displacement and strain of a moving surface or web of material).

The first surface recordings are obtained in a manner related to the first print station's image printing. "Related" means that recording the surface image and printing take place in defined distance or time relationship to a certain section of the image printed by the first print station, e.g. a certain raster line of this image. In some embodiments, recording the surface image and printing the certain raster line take place at the same time. In other embodiments, the surface image is recorded at a small distance before that section of the image (e.g. the certain raster line) to which the recording is related. A storage is provided which arranged to store the first surface recording.

The stored surface recording of the first print station and the surface recordings of the downstream print stations are compared by a surface recordings comparator. The comparator tests, during the recording medium movement, for correspondence of a downstream (e.g., the second) print station's surface recordings with the first surface recording.

Some embodiments also enable subsequent surface recordings of one and the same print station to be compared, from which a recording medium movement signal can be derived. In some of these embodiments, a separate comparator is provided for this "local" comparison, in others the comparator for comparing recordings of different print stations is arranged to also carry out the local comparisons.

In some embodiments, the comparator is part of a (typically digital) optical-sensor controller. In other embodiments, the comparator is a programmed processors, digital circuit or analog circuit dedicated to comparing surface recordings and finding corresponding ones. In still other embodiments a printer controller (typically a specialized micro-computer) which controls the print operation is programmed to also carry out the task of comparing and finding correspondences; the "comparator" is the programmed controller with the part of the program implementing the comparator functionality.

In the embodiments, finding that two compared recordings represent the same surface area of the recording medium is called a "correspondence". Although not excluded, generally two recordings which represent the same surface area will not be strictly identical. Rather, owing to limited resolution and sensitivity, such two recordings may slightly differ from each other. Furthermore, some embodiments also enable two recordings whose surface images are shifted relative to each other to be recognized as representing the same surface area. In these embodiments, the amount of shifting is also provided by the comparator and used in the registration process. The information provided by the optical sensor and the comparator used to register the images is also called "registration signal".

In the embodiments, the printer is arranged to repeatedly register, within one image, raster lines of the image printed by the second print stations to raster lines of the image printed by the first one in response to correspondences found between the surface recordings. At the first print station, a surface image is recorded in a manner related to the first print station's printing action. For example, a surface image is recorded by the first optical detector a certain time interval before the first print station prints the section of its image to which the surface recording relates; this section may be, for example, a certain raster line of the first print station's single-color image. The certain time interval corresponds to a certain advance from the recorded point of the recording medium surface to the related raster line. In order to register raster lines of the second image onto the first one, the second print station's optical detector then permanently records surface images during the advance of the recording medium and compares them with the recorded first surface image. A correspondence found between one of the second recordings and the first recording indicates that the recording medium now is in a position relative to the second print station's print head which corresponds to the position the recording medium had relative to the first print station's print head when the raster line of the first image was printed (apart from a possible shift of the recordings within the optical detectors, as mentioned above). The second print head then prints, in the same related manner (but taking into account the possible shift of the recordings), a corresponding raster line of its single-color image. For example, it prints the related raster line after the same time interval (or distance) as the one of the first print station (corrected by the possible shift of the recordings). Thus, the single-color images are registered. Further downstream print heads register their images to the first image in a corresponding way.

In some of the embodiments with two-dimensional optical detectors, not only relative shifts between the recorded surface images in the advance direction can be detected, but also shifts in the lateral direction (i.e. the direction perpendicular to it). A lateral shift indicates that the recording medium was subjected to a lateral displacement between the first and second two print stations. The lateral displacement information is included in the registration process, e.g. by laterally counter-shifting the second single-color image.

Figure 2:
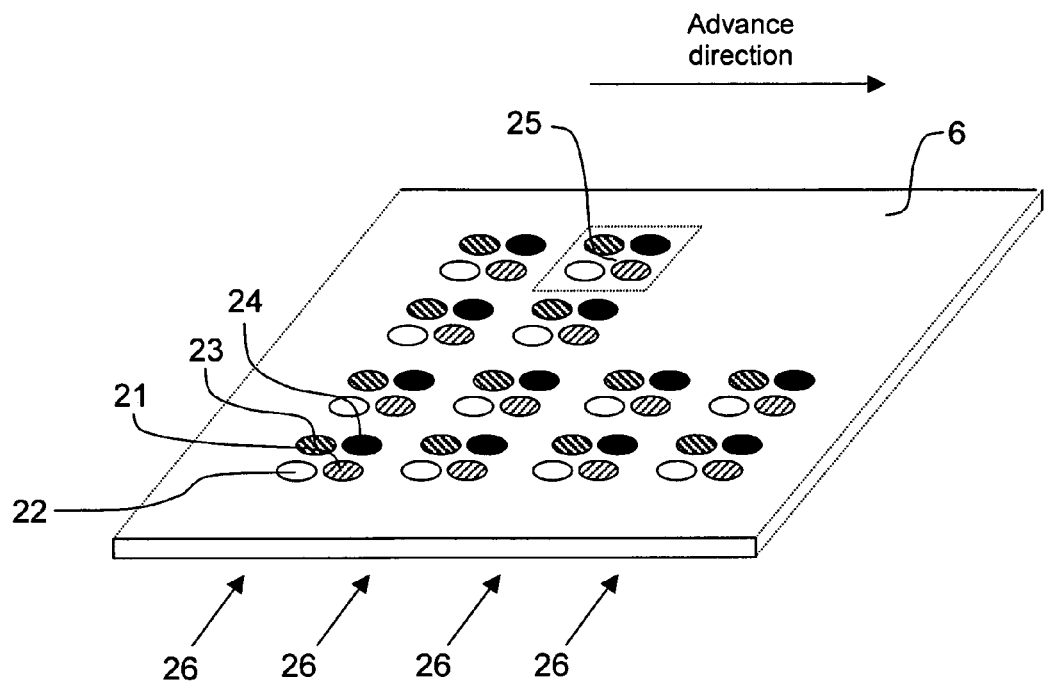
FIG. 2 illustrates a combination of different single-color dots to form multicolor dots.

FIG. 2 illustrates a part of a printed multicolor image which is composed of four different single-color images. In some of the embodiments, the images are formed by dots 25 which are arranged on a dot raster or grid with constant dot spacing. The dot density of the grid is usually given in the unit dots per inch (dpi). The higher the density, the higher is the resolution of the printed image. Typical resolutions are 300 dpi, 600 dpi, 1200 dpi or even higher, corresponding to 85 mm, 42 mm and 21 mm dot spacing, respectively.

Each of the dots 25 is correspondingly composed of four basic-color dots 21, 22, 23, 24 which are subsequently applied by the different print stations. The basic-color dots 21, 22, 23, 24 are closely positioned side-by-side or, in some embodiments, partly or completely overlapping so that they optically merge to a full-color dot 25 of the desired mixed color. A side-by-side arrangement of the basic-color dots 21, 22, 23, 24 can be considered as a small "intended misalignment"; the registration process is arranged such that this intended misalignment is achieved. A "raster line" 26 is a line of dots perpendicular to the advance direction. Incidentally, a dot does not require to be actually printed; it may rather be thought of as a virtual print position which can be with or without ink on it. It could also be mentioned that the full-color dots are often called "picture elements" (pixels) to differentiate them from the single-color dots, but herein both are referred to as "dots". Various intensities may be achieved by techniques such as halftoning, or by printing dots with different sizes.

In some embodiments, the registration procedure described above (based on a comparison of surface recordings of the first and second print stations) is carried out for each raster line. This ensures optimum registration accuracy, but requires considerable processor and storage performance for storing and analyzing a large number of surface recordings.

Figure 3:
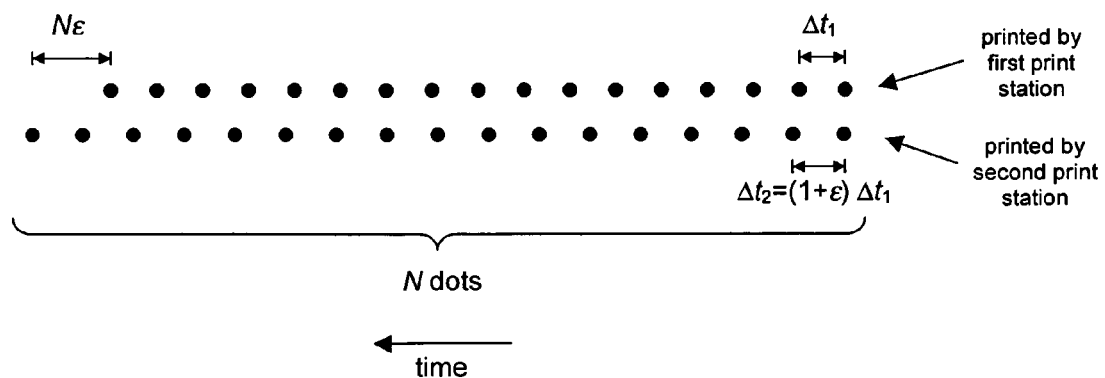
FIG. 3 illustrates the appearance of an accumulated error when single-color images with slightly different dot spacing are overlaid.

Therefore, in other embodiments, the registration procedure is not carried out for each raster line. A movement signal generator generates signals representative of the recording medium movement. These signals define the positions of the raster lines (or the timing of printing the raster lines) to be printed by the individual print stations after the registration procedure has been carried out for a certain raster line. However, a definition of dot positions based on movement signals is generally not free of systematic errors. Therefore, if too many raster lines are printed only based on movement signals, the systematic error may accumulate to form a considerable cumulated error. This is illustrated in FIG. 3 in which each raster line is represented by one dot. The upper line of dots represent the longitudinal positions of the raster lines printed by the first print station, and the lower line of dots represent the longitudinal positions of the raster lines printed by the second print station. Time is running from right to left. A registration procedure was carried out for the first raster line printed, therefore the rightmost dots of the two print stations are aligned in the longitudinal direction. The printing of the subsequent raster lines is triggered by the movement signals. It is assumed that print-station-individual movement signals are used, and that the movement signal used by the first print station has a period $\Delta t_1$, and the one used by the second print station has a slightly different period $\Delta t_2$ ($\Delta t_2 = (1+\epsilon)\Delta t_1$), due to systematic errors in the print-station-individual generation of the movement signals. After N dots this slightly different period accumulates to a cumulated error $N \cdot \epsilon$. The assumption that the movement signals' periods of the different print stations are different is only illustrative; similar errors may occur if the same movement signal is used for all print stations, for example if the recording medium's movement is not accurately represented by the (then common) movement signal (for example, this may be the case if the print paper is displaced or stretched).

In order to avoid the errors in dot positioning from accumulating into large cumulated errors, in some of the embodiments the printer is arranged to repeatedly register the raster lines of the second print station to the ones of the first print station based on comparing the recordings of the first and second optical sensors and finding correspondences between them, as explained above. The re-registration is, for example, repeated after a predefined number of image dots (or raster lines) printed by the first print station. The predefined number may depend on the performance of the processor and memory and the magnitude of the systematic error. A typical predefined number may be in the interval between three and ten; in an example described below the number is five.

In some of the embodiments, the positioning of the image dots (raster lines) is based on a movement signal which is common for all print stations. As mentioned above, a common movement signal is usually not aware of paper displacement or stretching or the like. In other embodiments, each print station uses a print-station-individual movement signal, i.e. a movement signal obtained by a measurement of the recording medium movement in the vicinity of the respective print station. Such print station-individual movement signals represent the local recording medium movement and are therefore aware of paper displacement, stretching etc. However, the calibrations of the individual movement signal generators may be different, so that they provide slightly different signals for one and the same movement, as explained above. Repeated registration (also called re-registration) prevent such errors from accumulating. This repeated registration may be performed by repeatedly adjusting the movement signal so that a raster line of the second print station becomes coincident with the corresponding one the first print station, also called "synchronization". The repeated adjustment of the movement signal is, for example, achieved by influencing the movement signal generator to perform the required signal shift or by shifting (delaying or advancing) the movement signals by the required amount.

In some of the embodiments, the optical sensors with the comparator(s) are not only used to provide the information on which the registration (including the re-registration) is based (i.e. the "registration signals"), but at least one of the optical sensors, and preferably all of them, also act as movement signal generator. The movement signal generation is also based on a comparison of recorded surface images, as in the registration signal generation described above, but the two surface images compared are images recorded by one and the same the optical sensor rather than by sensors at two different print stations.

The movement signal generation is based on recording at least two subsequent medium surface images by the same optical sensor, comparing them, determining a spatial shift between them and providing a movement signal representative of the spatial shift determined, i.e. the recording medium advance between the two recordings. Preferably, the movement signal is in the form of clock signals, wherein the clock signal period corresponds to a certain advance of the recording medium. For example, an advance of one longitudinal dot distance may be represented by one clock signal (i.e. by one clock pulse) or several clock signals (i.e. by several clock pulses).

In the movement signal generation, the optical sensor and the corresponding comparator operate in a print-station-local manner. Owing to this, and to the fact that only one previous surface recording is stored, the performance requirements are generally lower for the movement signal generation than for the registration signal generation.

Both signal generation modes may be simultaneously used, i.e. the registration signals and the movement signals may be simultaneously generated. For example, a certain surface recording may be locally used to provide the movement signal, and may also be included in the comparison between recordings of different print stations to provide the registration signal. In some embodiments one comparator performs all the processing to provide the registration and the movement signals. In other embodiments, each optical sensor used to provide movement signals is equipped with its own comparator which generates the movement signal of the associated print station.

In embodiments in which only a common movement signal is required, it is sufficient that only one of the optical sensors is used for the movement signal generation. In embodiments with print-station-individual movement signals, all the optical sensors are used for the movement signal generation and provide their associated print station with a print-station-individual movement signal indicative of the local recording medium movement.

There are other techniques of providing movement signals which are based on encoders, i.e. on encoder patterns at members of the printer which move or rotate together with the recording medium and (usually optical) sensors responsive to the moving encoder pattern. In some of the embodiments, a recording medium conveyor which advances the recording medium (e.g. a belt arrangement which advances the print paper) is equipped with a co-moving encoder pattern, for example, arranged at the edge of the belt. In some of these embodiments, one encoder pattern sensor is provided to generate a common movement signal for all print stations. In other embodiments, each print station is equipped with its own encoder pattern sensor to obtain a print-station-individual movement signal indicative of the local conveyor movement. Still other embodiments have a rotary encoder coupled to the recording medium conveyor, for example, a rotating shaft of the conveyor. The rotary encoder generates a common movement signal for all print stations.

Returning now to FIG. 1, a multicolor printer has several (here: four) successively arranged print stations 1. A conveyor belt 2 is arranged beneath the print stations 1, guided by two rollers 3, wherein at least one of the rollers 3 is driven by an advance mechanism in an advance or longitudinal direction 4 during the printing process. The belt 2 conveys on its outer surface 5 a recording medium 6, e.g. a paper sheet, which is moved during printing past the print stations 1. The printer is a large-format page-width printer, e.g. an ink-jet printer. Its print-width is, in one embodiment, about 24 inches or 610 mm (for A1 and ANSI D paper formats). Other embodiments have a larger print width, for example, in the range of 30–40 inches or 760–1020 mm (for A0, ISO B0 and ANSI E paper formats), or even larger than 40 inches or 1020 mm (for larger paper formats). Each print station 1 extends in a lateral direction 7 normal to the advance direction 4 across the width of the belt 2. Owing to the successive arrangement of the print stations, when the print medium 6 is conveyed, a certain point of it successively passes the individual print stations 1. In order to produce a multicolor image 8 in which the single-color images are aligned or "registered", the print stations produce their single-color images in a timely shifted manner which compensates for the fact that a point of the paper does not pass all the print stations 1 simultaneously, but only successively.

Each print station 1 is provided with an optical sensor 12 which includes a photosensor array 14 arranged to view a surface area 13 of the recording medium 6. Since the optical sensor 13 is at rest and the recording medium 6 is moved, the viewed area 13 of the recording medium surface constantly changes. Each optical sensor 12 is attached to its print station 1 in a fixed mechanical relationship so that the optical sensor's longitudinal and lateral positions represent the print station's position to which it is attached, apart from a constant offset vector describing the relative position of the optical sensor 12 and its print station 1 in the longitudinal and lateral directions. When the print station's position changes, e.g. due to thermal expansion, the sensor arrangement's position is therefore correspondingly changed. The offset vectors are either accurately known or are designed to be identical (with a certain accuracy) for all print stations. In FIG. 1, the optical sensors 12 are arranged, with respect to the longitudinal direction 4, in close vicinity to their respective print station 1, e.g. a small longitudinal distance before the print head of their respective print station 1.

The optical sensors 12 record images of the surface areas 13 used to register raster lines of the single-color images printed by the individual print stations 1. To this end, they are connected to a printer controller 9 by data lines which transfer data representing recorded surface images. The controller 9 has a storage 15 arranged to store surface recordings obtained at the first print station 1 (i.e. the most upstream print station). The controller 9 is programmed such that it implements three comparators 10, 10', 10" for comparing a stored surface image of the first print station 1 with recorded surface images of the second, third and fourth print station 1, respectively. It is likewise possible to compare recordings of the first and second print station, the second and third print station, and the third and fourth print station, respectively. The controller 9 is also connected to the print head of each print station 1 and may be connected to the advance mechanism. It translates image data representing the image to be printed and received from outside into printing commands for each print station 1. It performs, using the registration information from the optical sensors 12 and the comparators 10, 10', 10", the translation such that the single-color images printed by the individual print stations 1 are registered onto each other. In other embodiments, the comparators are not implemented by the controller 9, but are distinct devices. In further embodiments, only one comparator 10 (implemented by the controller or separate) is provided which carries out all the three comparisons mentioned above.

The optical sensors 12 also record images of the surface areas 13 used to provide print-station-individual clock signals indicative of the advance movement of the recording medium 6 at the respective print station 1 (the recordings used therefor may include the recordings used for the registration procedure). The generation of the movement clock signal is based on comparing subsequent recordings of one and the same optical sensor 12, i.e. on local comparisons. To this end, in FIG. 1 each optical sensor 12 is equipped with a local movement signal generator 11 which performs the local comparison of subsequent recordings and generates the print-station-individual movement clock signals. The movement clock signals define the longitudinal dot raster for the individual print stations 1. As will be explained in connection with FIG. 5, the movement clock signals of the second, third and fourth print stations 1 are repeatedly "re-synchronized" so as to re-register the dot rasters defined by them to the first print station's dot raster.

Figure 4:
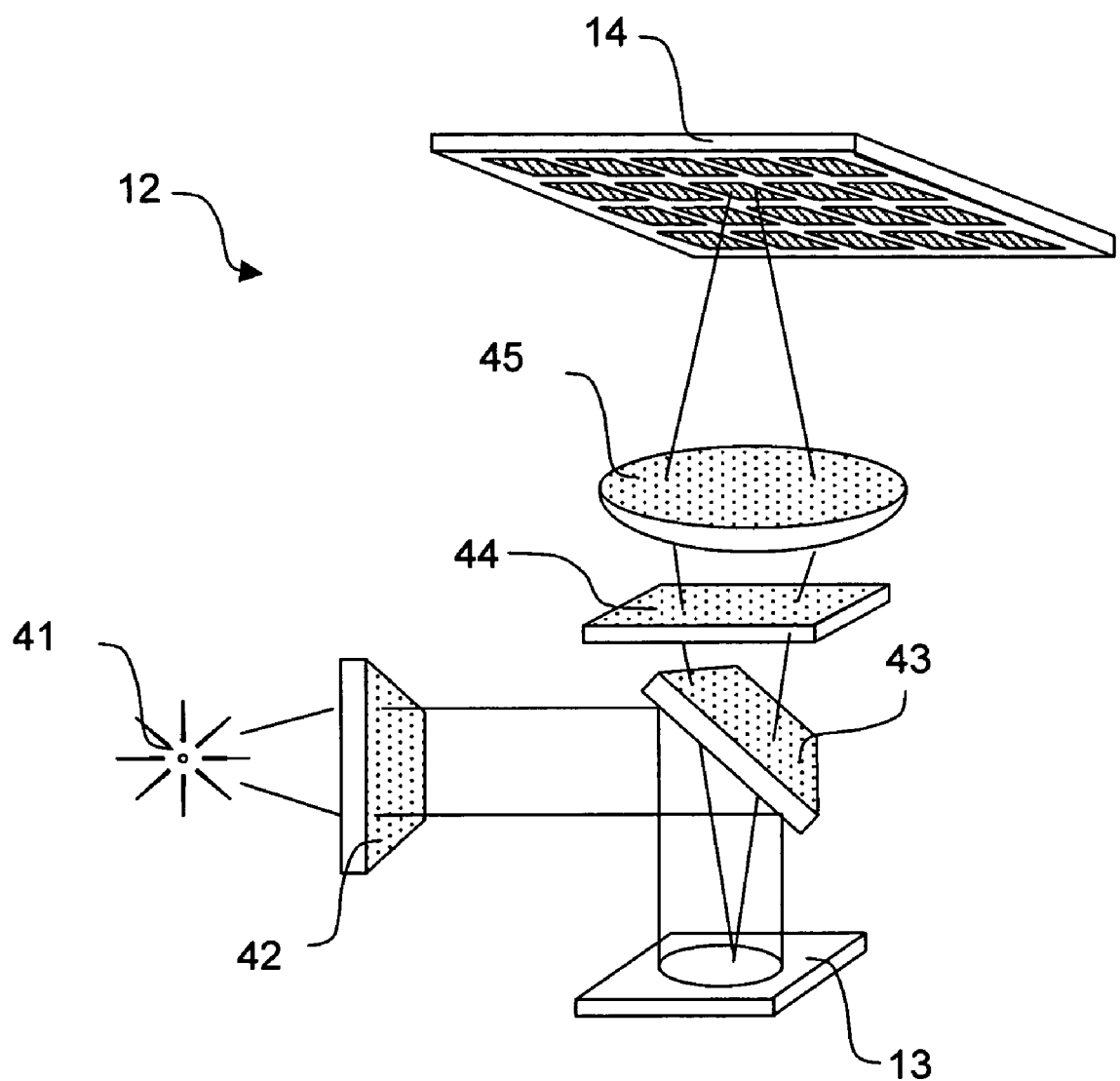
FIG. 4 is a schematic view of an optical sensor.

FIG. 4 illustrates an embodiment of the optical sensor 12. The photosensor array 14 is here a two-dimensional array of photosensor elements, such as charge-coupled devices (CCDs), CMOS devices, or amorphous silicon devices. Optionally, one or more light sources 41 may be provided to illuminate the surface area 13 to enhance contrast of the surface structure (e.g. a paper fiber structure). Light from the light source 41 is collimated at illumination optics 42 and then redirected by an amplitude splitting beam-splitter 43 to illuminate the recording medium surface in the area 13. Reflected or scattered light from the surface area 13 is passed through the beam-splitter 43 for aperturing and filtering at element 44 and focusing by element 45 to an image on the photosensor array 14 which detects the focused light from the recording medium. The magnification of the imaging optics 45 is constant over the field-of-view of the photosensor array 14. Further optical elements such as lenses, spatial-frequency filters, color filters polarization filters, etc. may be used to improve the quality of the image on the photosensor array 14.

The patterns or structures detected on the surface of the recording medium by the optical navigation sensor are inherent in the recording medium material, such as fibers in print paper. Therefore, no pre-printed marks, such as index marks, encoding marks or the like, are required on the recording medium 6 or the belt 2 (however, the registration and movement signal generation also works if a recording medium is used with pre-printed marks or any other structures printed on it).

Figure 5:
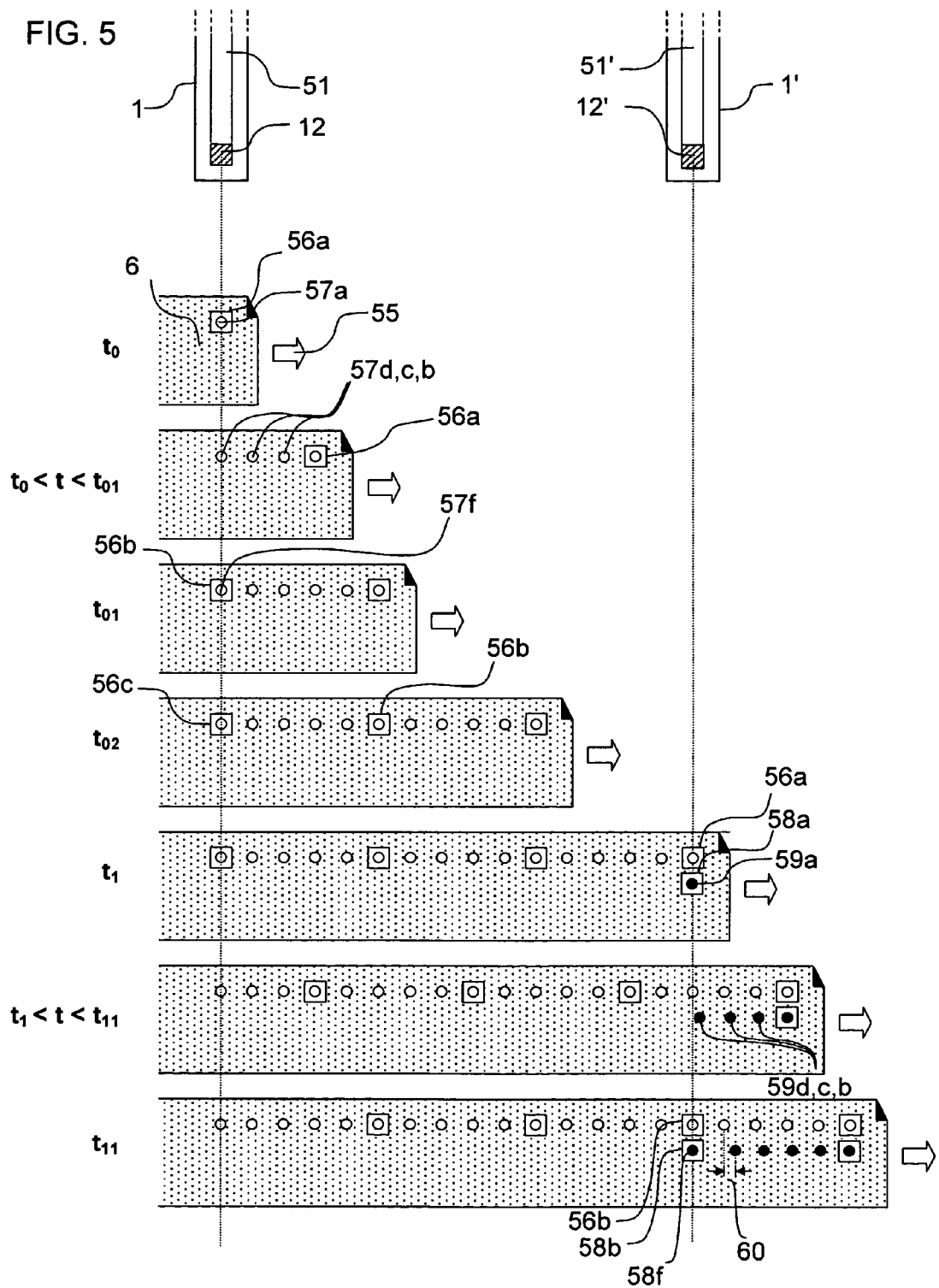
FIG. 5 illustrates a registration of two single-color images by different "snap shots" of an advancing print process.

FIG. 5 illustrates an embodiment of the registration process for a first print station 1 and a second print station 1' with print heads 51, 51' and optical sensors 12, 12'. The recording medium 6 is moved in the advance direction 55. The first print station 1 is upstream of the second print station 1'. The optical sensors 12, 12' are arranged a certain distance upstream of their respective print heads 51, 51' so that information recorded by them can still influence subsequent printing at the recorded position, despite the recording medium movement. For the purpose of simplification, in FIG. 5 the sensors 12, 12' are shown at the same longitudinal positions as the print heads 51, 51', and it is assumed that the recording of surface images instantaneously influences the raster to be printed. The progress of the registration and print process is illustrated by seven "snap shots", one below the other, of subsequent phases of the recording medium's advance movement. The squares 56, 58 shown in FIG. 5 do not indicate that squares are visible on the recording medium 6. Rather, they illustrate, in a virtual manner, images of surface areas 13 of the recording medium 6 which are recorded by the optical sensors 12, 12' and compared to achieve registration. Likewise, the circles 57, 58 in FIG. 5 do not show actually printed ink dots, but they rather illustrate the longitudinal positions of virtual single-color raster lines (ink may or may not be printed on these lines, depending on the picture to be printed).

At time $t_0$, an image 56a of the recording medium surface at the current recording medium position is recorded by the first optical sensor 12 and the first print station's print head 51 prints the first raster line 57a of its single-color image. The recorded image data is then transferred to the controller 9 (FIG. 1) and stored in the storage 15 so that it is available for a later comparison with surface images recorded at the second print station 1'.

Between time $t_0$ and time $t_{01}$, the first print station's print head 51 prints raster lines 57b, 57c, 57d of its single-color image. The relative longitudinal positions of the raster lines 57a to 57d and further raster lines to be printed are defined by movement clock signals which are, for example, derived from a local comparison of surface images constantly recorded by the first optical sensor 12. For example, each movement clock signal triggers the printing of one raster line 57. The raster lines 57 are triggered such that an image with a constant dot spacing $R_1$ (e.g. $R_1$=1199 dpi) close to a nominal dot spacing R (e.g. R=1200 dpi) is obtained. The deviation between R1 and R will generally be due to systematic errors. Every Nth clock signal (N=5 in FIG. 5) triggers the recording of a surface image 56.

Consequently, at time $t_{01}$, the movement clock signal following the predetermined number N of movement clock signals triggers recording of a second image 56b by the first optical sensor 12 of the medium surface at the current print medium position. This image 56b is also transferred and stored so that it is available for a later comparison with surface images recorded at the second print station 1'. These steps are repeated, as indicated at time $t_{02}$ in FIG. 5. The storage 15 is preferably a FIFO stack (first-in-first-out stack), and the surface images 56a, 56b, 56c, etc. are preferably stored on the FIFO stack so that they can be used by the second print station 1' to register its single-color image to the first print station's image in a first-in-first-out manner.

The optical sensor 12' at the second print station 1' and the comparator 10 constantly record surface images of the recording medium and test them for correspondence with the first print station's first recording 57a. At time $t_1$, the recording medium area which was recorded in the first station's first surface image 56a arrives at the second print station's optical sensor 12', and the comparator detects that the second print station's currently recorded surface image 58a corresponds to the stored first station's first surface image 56a. This information is now used to register the first raster line 59a of the image printed by the second print station 1' to the first raster line 57a of the first print station's image (the lateral displacement of the surface images 56, 58 and the dots 57, 59 in FIG. 5 is only shown to increase the legibility of the figure). The raster printed by the second print station 1' is defined by a movement clock signal of the second print station 1'. The re-registration is, for example, achieved by synchronizing the second print station's movement clock signal such that the second print station's first raster line 59a is positioned at the first print station's first raster line 57a.

The second print station's movement clock signals are derived from a local comparison of surface images constantly recorded by the second optical sensor 12'. Owing to the synchronization of the movement clock signal, raster lines 59b, 59c, 59d printed subsequently by the second station's print head 51' follow the registered first raster line 59a with the required raster spacing. As can be seen in the representation of the time interval between $t_1$ and $t_{11}$, the raster lines 59 of the second print station 1' cumulatively deviate from the first print station's raster lines 57. The cumulative error after five raster lines is denoted by 60 in FIG. 5. It is due to systematic errors which will generally cause the raster produced by the second station's movement clock signal to be slightly different from the one produced by the first station's movement clock signal. For example, the second print station's dot spacing may be $R_2=1201$ dpi, i.e. close to the nominal dot spacing R, but not identically to R or $R_1$.

At time $t_{11}$, the first print station's second surface image 56b arrives at the second print station's optical sensor 12', and the comparator detects that the second print station's currently recorded surface image 58b corresponds to the surface image 56b. This information is now used to re-register the next raster line 59f of the image printed by the second print station 1' to the corresponding raster line 57f of the first print station's image. Again, the re-registration is, for example, achieved by re-synchronizing the second print station's movement clock signal such that the raster line 59f is positioned at the corresponding first print station's raster line 57f. Owing to the re-synchronization of the movement clock signal subsequent raster lines printed by the second print head 51' follow the re-registered raster line 59f with the required raster spacing. Since every N raster line a correspondence will be detected between a surface image 56 recorded at the first print station 1 and a surface image 58 recorded at the second print station 1', this re-registration and re-synchronization procedure is repeated after N raster lines, so that an error accumulation beyond the one illustrated in FIG. 5 is avoided.

Figure 6:
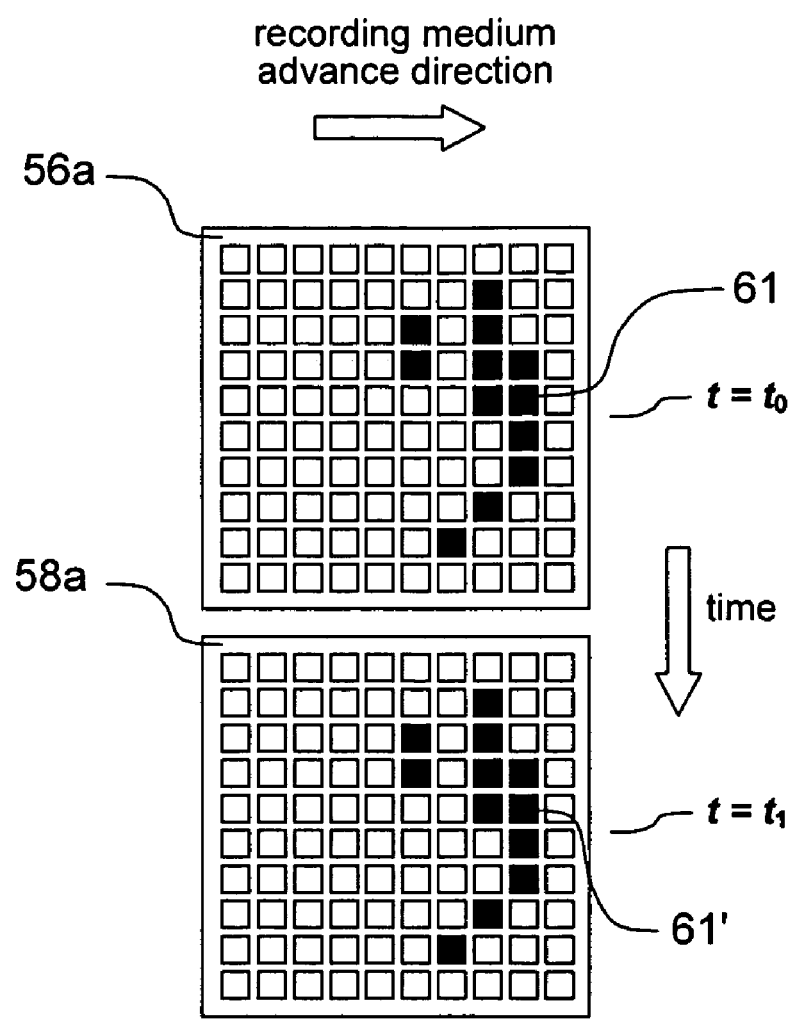
FIG. 6 shows exemplary surface recordings taken at a first and a second print station of FIG. 5, used in the registration of the single-color images.

FIG. 6 illustrates the recording and comparing of exemplary surface images 56a, 58a recorded by the optical sensors 12, 12' at $t_0$ and $t_1$ in FIG. 5. The surface recordings 56a and 58a are shown in a rasterized form, as typically obtained with a two dimensional CCD sensor array 14 (FIG. 4). The surface image 56a includes an image 61 of an exemplary surface structure element of the recording medium, for example a paper fiber. An identical or similar image 61' of the same paper fiber is included in the second print station's surface recording 58a. Using conventional image processing methods, the comparator 10 (FIG. 1) detects that the surface images 56a and 58a correspond to each other and provides a corresponding registration signal which is used in the registration procedure, as described in connection with FIG. 5. For example, the surface images 56a, 58a each may be mathematically represented by a two-dimensional matrix, the dimensions of which correspond to the pixel numbers in the longitudinal and transversal directions of the recordings 56a, 58a (which, in turn, may correspond to the dimensions of the photosensor arrays 14 (FIG. 4)). The matrix elements may represent the gray-level measured in each pixel of the photosensor array. A correspondence may be found by comparing the two matrices, for example by an estimator function (e.g. a least-squares-estimator) which quantifies the degree of deviation between the two surface recordings 56a, 58a compared. If the quantified deviation is smaller than a certain maximum deviation, a "correspondence" between the two surface recordings 56a and 58a is detected; and the registration procedure is based on this detection of the correspondence, as described above. The same procedure is carried out for subsequent recordings 56b, 58b; 56c, 58c; etc.

In some of the embodiments, the images of the surface structures 61, 61' may be relatively shifted within the images 56a, 58a; 56b, 58b; 56c, 58c; etc., and the amount of shift is then also determined (similar to the explanation of FIG. 7 below). The shift determined is then taken into account in the registration of the second print station's raster lines 59a; 59b; 59c; etc. to the corresponding first print station's raster lines 57a; 57b; 57c; etc.

Figure 7:
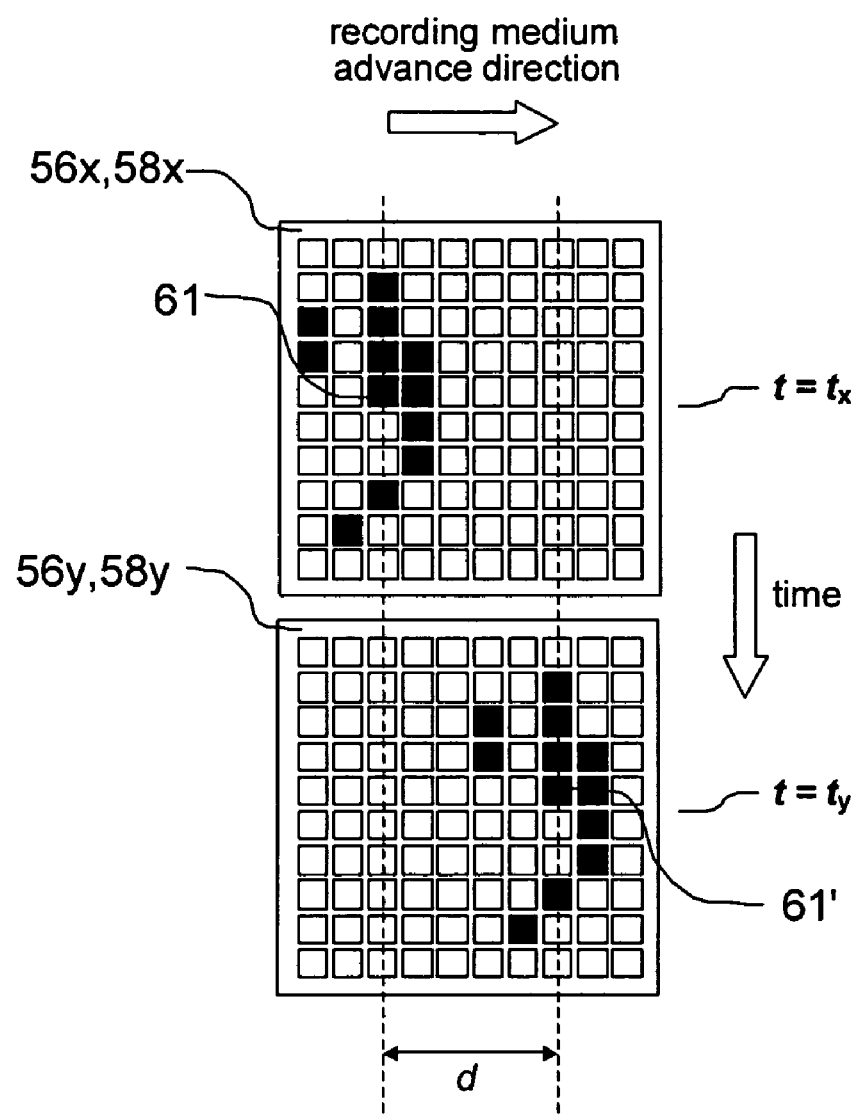
FIG. 7 shows exemplary surface recordings similar to FIG. 6, but subsequently taken at one print station to provide a movement signal.

FIG. 7 illustrates a local comparison of surface images to measure the movement of the recording medium, an information on which the movement clock signal generation is based. A surface image 56x is recorded at the first print station 1 at a time $t_x$. It includes an image 61 of a surface structure, e.g. a paper fiber (similar to FIG. 6) at a certain position in the image 56x. A short time interval later, at time $t_y$, another surface image 56y is recorded by the same print station's optical sensor 12. The time interval between $t_x$ and $t_y$ is, for example, a fraction of the time needed to advance the recording medium from one raster line (e.g. 57a) to the next one (e.g. so as to provide movement information with a resolution better that the dot spacing). In the second recording 56y, the position of the image 61' of the structure element is shifted by a distance d with respect to its position in the first surface image 56x. The distance d corresponds to the advance of the recording medium in the time interval between $t_x$ and $t_y$.

The shift d is, for example, determined by using mathematical matrix representations of the surface recordings 56x and 56y, similar to FIG. 6 described above. In one of the matrices (e.g. the one corresponding to 56y), the represented image is mathematically shifted in a stepwise manner (matrix elements which are artificially entered in such a mathematical-shift operation are set to a neutral value, e.g. to 0). Comparisons between the other (unshifted) matrix (e.g. 56x) and each of the shifted matrices are then carried out, and the degree of deviation is determined for each shifted matrix (similar to FIG. 6 described above). One of the shifted matrices will provide a minimum degree of deviation from the unshifted matrix. The amount by which this matrix was shifted is an estimate of the actual shift d between the surface structures, and, accordingly, of the movement of the recording medium in the time interval from $t_x$ to $t_y$. By repeatedly carrying out this local recording and comparison procedure, the recording-medium advance is measured. The generation of the movement clock signal is based on this measurement. The recording of the surface images 56x, 56y used for the local comparison is triggered by a clock which is independent of the recording-medium movement. If, for example, at a typical recording-medium speed four such recordings are triggered between two subsequent raster lines 57, the sum of the distances d determined in four such recordings will approximately correspond to a dot distance, so that a movement clock signal will be generated after the fourth recording.

In the embodiment shown in FIG. 1, such a local recording and comparison of surface images is carried out at each of the print stations 1 so that the print operation of each print station 1 is individually triggered by print-station-individual movement clock signals, as illustrated in FIG. 5. In other embodiments, such a local image recording and comparison procedure is only carried out at one of the print stations 1, preferably the first print station, and the movement clock signals derived from it are used as common movement clock signals by all print stations.

Figure 8:
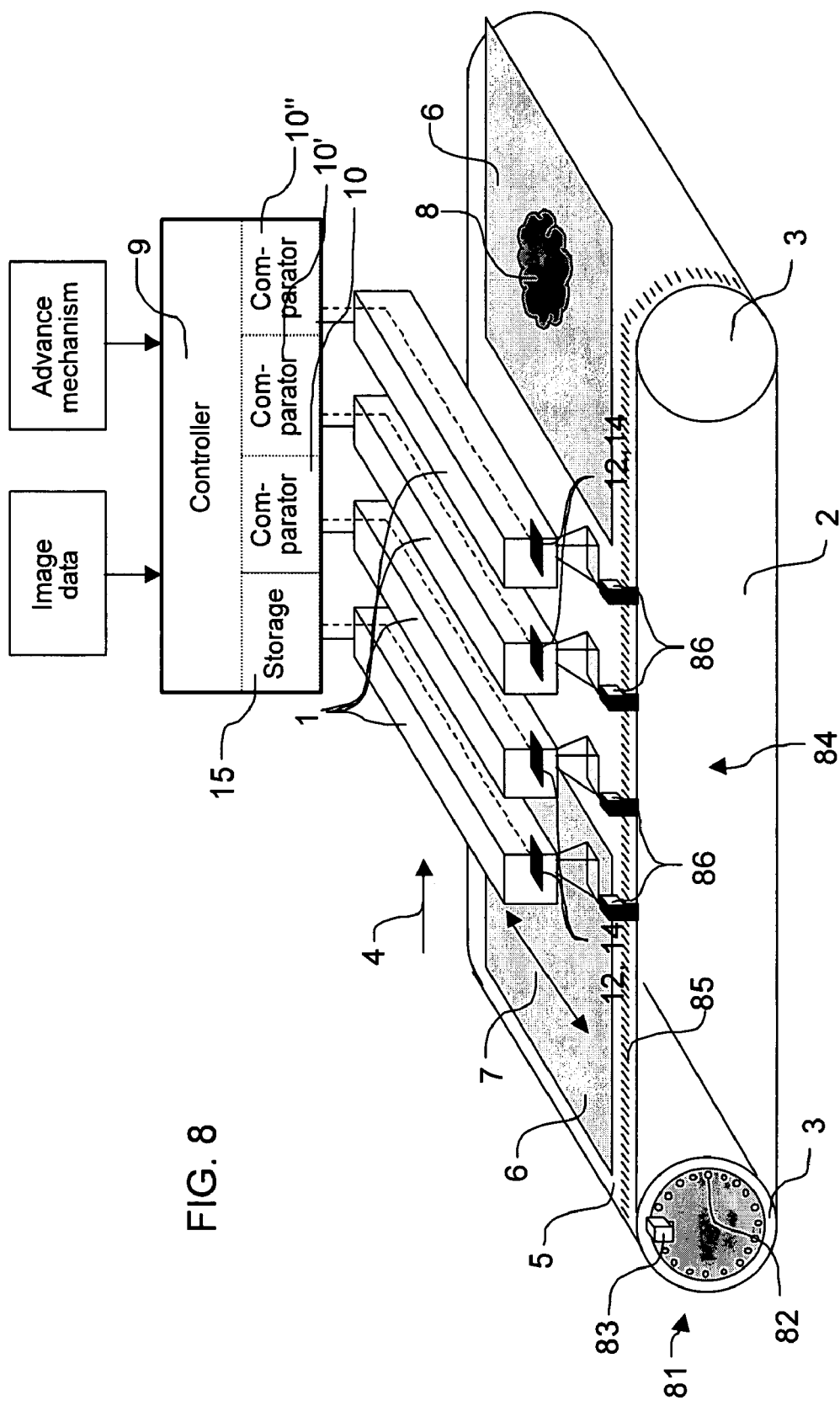
FIG. 8 is a schematic view of a printer similar to FIG. 1, illustrating two alternative embodiments in which the movement signal is generated by encoders.

FIG. 8 illustrates two other embodiments of a printer in which the movement signal generation is based on encoder signals. Apart from that, the printer shown in FIG. 8 corresponds to the one of FIG. 1. In one of the embodiments, one of the rollers 3 is equipped with a rotary encoder 81 with encoder marks 82 and an encoder mark sensor 83. The encoder marks 82 are arranged near the circumference of the face of the roller 3 and rotate together with the roller 3. The encoding mark sensor 83 (for example, an optical sensor) is fixed and provides an encoder clock signal each time one of the encoder marks 82 passes by. The encoder clock signals are indicative of the advance movement of the belt 2 and the recording medium 6 disposed on the belt 2. They are used as a common movement clock signal for all print stations 1.

Another embodiment of an encoder 84 is also illustrated in FIG. 8. It includes encoder marks 85 attached to the outer surface of the conveyor belt 2 near the belt edge, and encoder mark sensors 86 responsive to the encoder marks 85. Each print station 1 is equipped with its own encoder mark sensor 86. Each of the encoder mark sensors 86 provide an encoder clock signal when an encoder mark 85 passes by. The encoder mark sensors 86 are attached to their respective print stations 1 in a fixed mechanical relationship. The encoder clock signals are print-station-individual movement signals which are used for a print-station-individual definition of the raster lines of the different print stations 1, as explained in connection with FIG. 5.

Thus, the described embodiments enable multicolor images to be printed with improved accuracy.

All publications and existing systems mentioned in this specification are herein incorporated by reference.

Although certain methods and products constructed in accordance with the teachings of the invention have been described herein, the scope of coverage of this patent is not limited thereto. On the contrary, this patent covers all embodiments of the teachings of the invention fairly falling within the scope of the appended claims either literally or under the doctrine of equivalents.

What is claimed is:

1. A multicolor-printer, comprising:
   at least a first and a second print station arranged to print images on a surface of a moving recording medium;
   first and second optical sensors configured to detect a non-printed pattern structure on the surface of the recording medium, viewing, at the first and second print stations, an area of the recording medium surface to obtain at least one first surface recording, in a manner related to the first print station's image printing, and second surface recordings, respectively, wherein the first surface and second surface recordings are recordings of non-printed pattern structures;
   a storage arranged to store the first surface recording;
   a surface recordings comparator arranged to test, during the recording medium movement, for correspondence of second surface recordings with the stored first surface recording;
   wherein the printer is arranged to repeatedly, within one image, re-register raster lines of the image of the second print station to corresponding raster lines of the image of the first print station in response to correspondences found between the first and second surface recordings.

2. The multicolor-printer of claim 1, wherein the relation of the first surface recording to the first print station's image printing is such that the first surface recording is taken: (a) when the first print station's prints a certain raster line of its image, or (b) at a predetermined distance before the first print station prints a certain raster line.

3. The multicolor-printer of claim 1, comprising at least one movement signal generator generating signals representing recording medium movement,
   the first and second print stations being arranged to form their images by image dots on raster lines defined on the basis of the movement signals, between repeated re-registrations.

4. The multicolor-printer of claim 3, arranged to repeat the registration of the image dots of the second print station to the ones of the first print station after a predefined number of raster lines.

5. The multicolor-printer of claim 3, comprising print-station-individual movement signal generators, and being arranged to base the definition of the image dots of the first print station on the first print station's movement signals and of the image dots of the second print station on the second print station's movement signals.

6. The multicolor-printer of claim 3, comprising at least one movement signal generator arranged to use at least two subsequent medium surface recordings recorded by the same optical sensor, compare them, determine a shift between them and provide a movement signal related to the shift determined.

7. The multicolor-printer of claim 3, comprising a recording medium conveyor equipped with an encoder forming the movement signal generator.

8. The multicolor-printer of claim 1, wherein the optical sensors comprise two-dimensionally extended sensor-cell arrays.

9. The multicolor-printer of claim 1, wherein the optical sensors are charge coupled devices.

10. The multicolor-printer of claim 1, wherein the printer is an ink-jet printer.

11. The multicolor-printer of claim 1, wherein the printer is a page-width printer.

12. The multicolor-printer of claim 1, wherein the printer is a large-format printer.

13. The multicolor-printer of claim 1, comprising at least one further downstream print station with a further optical sensor to obtain a further surface recording and arranged to treat the further surface recording and register the image of the further downstream print station to the image of the first print station in a manner analogous to the second surface recording and the second print station.

14. A multicolor-printer, comprising:
   at least a first and a second print station arranged to print images on a surface of a moving recording medium;
   first and second optical sensors configured to detect a non-printed pattern structure on the surface of the recording medium, viewing, at the first and second print stations,
   an area of the recording medium surface to obtain at least one first surface recording, in a manner related to the first print station's image printing, and second surface recordings, respectively, wherein the first and second surface recordings are recordings of non-printed pattern structures;
   a storage arranged to store the first surface recording;
   a surface recordings comparator arranged to test, during the recording medium movement, for correspondence of second surface recordings with the stored first surface recording;
   at least one movement signal generator generating signals representing recording medium movement;
   wherein the printer is arranged to repeatedly, within one image, re-register raster lines of the image of the second print station to corresponding raster lines of the image of the first print station in response to correspondences found between the first and second surface recordings, and
   wherein, between repeated re-registrations, the first and second print stations are arranged to form their images by image dots on raster lines defined on the basis of the movement signals.

15. A method of printing images onto each other on a surface of a moving recording medium using a printer having at least a first and a second print station and first and second optical sensors configured to detect a non-printed pattern structure on the surface of the recording medium, viewing, at the first and second print stations, an area of the recording medium surface, comprising:

taking a first surface recording at the first print station and relating it to a raster line of the image printed by the first print station;

taking, at the second print station and during the recording medium movement, second surface recordings, wherein the first and second surface recordings are recordings of non-printed pattern structures, and testing for correspondence of the second surface recordings with the first surface recording;

registering, in response to a correspondence found between one of the second surface recordings and the first surface recording, a corresponding raster line of the image printed by the second print station to the raster line of the image printed by the first print station, wherein the activities of taking a first surface recording, taking second surface recordings, testing for correspondence, and registering a corresponding raster line of the image are repeated so that, within one image, repeated re-registrations are performed.

16. The method of claim 15, comprising generating movement signals representing recording medium movement, forming the images of the first and second print stations by image dots defined by the movement signals, and forming the images, between repeated re-registrations, by image dots on raster lines defined on the basis of the movement signals.

17. The method of claim 16, wherein the registering of the image dots of the second print station to the ones of the first print station is repeated after a predefined number of image dots.

18. The method of claim 16, further comprising:

generating print-station-individual movement signals;

basing a definition of the image dots of the first print station on the first print station's movement signals and of the image dots of the second print station on the second print station's movement signals.

19. The method of claim 16, comprising generating the movement signals by means of at least one of the optical sensors based on recording at least two subsequent medium surface recordings by the same optical sensor, comparing them, determining a shift between them and providing a movement signal related to the shift determined.

20. A method of printing images onto each other on a surface of a moving recording medium using a printer having at least a first and a second print station and first and second optical sensors configured to detect a non-printed pattern structure on the surface of the recording medium, viewing, at the first and second print stations, an area of the recording medium surface, and at least one movement signal generator generating signals representing recording medium movement, comprising:

taking a first surface recording at the first print station and relating it to a raster line of the image printed by the first print station;

taking, at the second print station and during the recording medium movement, second surface recordings, wherein the first and second surface recordings are recordings of non-printed pattern structures, and testing for correspondence of the second surface recordings with the first surface recording;

registering, in response to a correspondence found between one of the second surface recordings and the first surface recording, a corresponding raster line of the image printed by the second print station to the raster line of the image printed by the first print station, wherein the activities of taking a first surface recording, taking second surface recordings, testing for correspondence, and registering a corresponding raster line of the image are repeated so that, within one image, repeated re-registrations are performed, and, wherein, between repeated re-registrations, the images are formed by image dots on raster lines defined on the basis of the movement signals.

* * * * *